April 11, 1950     F. R. GRUNER     2,503,438
DELAYED BRAKING FOR ELECTRIC MOTORS
Filed April 5, 1946     2 Sheets-Sheet 1

INVENTOR
Frederick R. Gruner
BY
William S. Gates
ATTORNEY

April 11, 1950        F. R. GRUNER        2,503,438

DELAYED BRAKING FOR ELECTRIC MOTORS

Filed April 5, 1946        2 Sheets-Sheet 2

INVENTOR
Frederick R. Gruner
BY
William S. Gates
ATTORNEY

Patented Apr. 11, 1950

2,503,438

UNITED STATES PATENT OFFICE 2,503,438

DELAYED BRAKING FOR ELECTRIC MOTORS

Frederick R. Gruner, Milwaukee, Wis., assignor to Allis-Chalmers Manufacturing Company, Milwaukee, Wis., a corporation of Delaware Application April 5, 1946, Serial No. 659,697

8 Claims. (Cl. 318—364)

This invention relates to motor control systems and more particularly to operation and control of mechanically vibrated devices which are resiliently mounted for free vibration, and vibrated by a motor driven rotary vibrating mechanism carried by the vibrated body.

Devices of the type mentioned are usually, if not always, vibrated at a frequency, that is driven at a speed, higher than the natural frequency of free vibration of the vibrating mass on its resilient support. In ordinary devices of this type difficulty is experienced in that in starting and stopping it is necessary to accelerate and decelerate the rotary mechanism through a critical speed range resonant with the natural frequency of the vibrating system. At such critical speeds the device is apt to commence to vibrate erratically, or plunge, at abnormally large amplitude, endangering the drive, the mounting and supporting structure and the vibrating body. Numerous corrective measures have been applied in the prior art to damp out or snub such transient vibrations and prevent the building up of disastrous resonant forces.

It has been observed by the applicant herein that the undesirable plunging occurs to only a negligible degree on starting if the driving motor has a sufficiently high starting torque to accelerate the mechanism rapidly through the critical speed range. Thus, if an adequate induction motor is employed the danger of plunging on starting is largely avoided. On stopping, however, the inertia of the vibrating mechanism causes it to decelerate so slowly that dangerous plunging is apt to occur at the critical speed. Snubbing devices are of some utility in avoiding this, but it occurred to the inventor that if the device could be decelerated at a rate as great or greater than its rate of acceleration, the plunging could be avoided without the employment of snubbing devices. Two methods of braking the mechanism by applying braking force to the motor were available, notably mechanical braking applied to the motor shaft on stopping, and plugging or electro-dynamic braking of the motor armature.

However, merely to dynamically brake the motor immediately upon deenergizing the normal driving circuit would cause undesirably high plugging currents, and use of the usual automatic solenoid actuated mechanical brake would result in unnecessarily great brake wear due to unnecessary application of the brake immediately upon deenergization of the motor.

This invention has as its object the provision of a simple automatic decelerating control operative to decelerate the machine through the critical speed after deenergization of the driving motor.

Another object is to decelerate the machine rapidly through the critical speed by delayed dynamic braking.

A still further object is to decelerate the rotating mechanism rapidly through the critical range of speeds by automatic delayed mechanical braking.

Still another object is to provide an automatically functioning time delay controlling circuit for delayed application of a braking force to rapidly decelerate a rotary vibrating mechanism through a critical range of speeds.

The invention having the above and still further objects and advantages that may appear herein may best be carried into practical effect as described herein with reference to the accompanying drawing in which.

Figure 1:
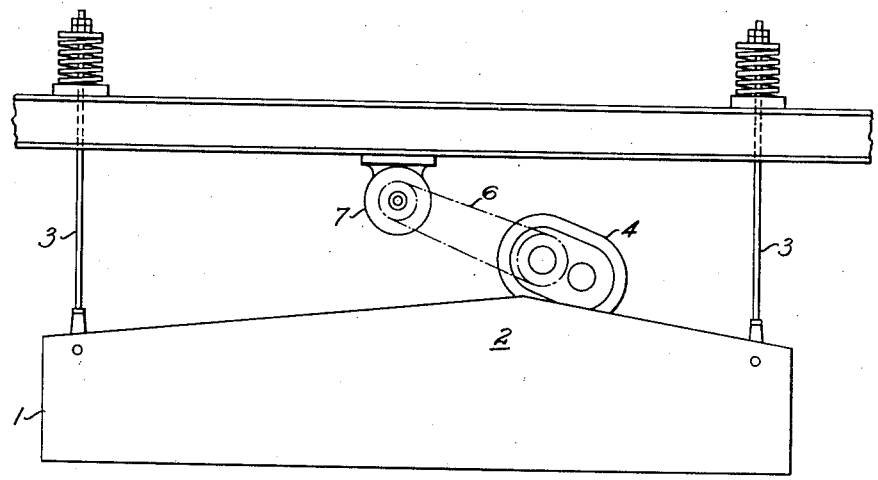
Fig. 1 is a front elevation of a vibrating screen embodying the invention.

Fig. 1 of the accompanying drawing shows, as an illustration of one of many known types of vibrating material treating or conveying devices in connection to which the present invention finds utility, a conventional vibrating screen 1 of known type.

United States patents to C. S. Lincoln Nos. 2,144,382 and 2,292,327 show screens of the same general type, more in detail. Such devices have a vibrating mass 2 supported by resilient means 3 and carrying a rotary vibrating mechanism 4 driven through a flexible drive transmission 6, such as a multiple V-belt drive, by an electric motor 7.

The structure of the foregoing paragraph is well known and forms no part of the present invention except as combined with the braking device and control circuit described and claimed hereinafter.

In operation, devices of this character of screen 1 generally have a natural frequency of vibration which is much lower than the normal frequency of operation of the mass 2, or the speed of vibrating mechanism 4. As a result, in starting and stopping, the machine must be accelerated and decelerated through a speed range, called the critical speed, at which the vibrations induced by the mechanism 4 will be in resonance with the natural frequency of free vibration of the vibrating system. At such critical speeds, if long maintained, the mass 2 will begin to plunge or vibrate erratically at magnified amplitudes endangering the supports and the structure of the machine.

Applicant, by providing a motor 7 having adequate starting characteristics causes the vibrating mechanism to accelerate rapidly so as to pass so quickly through the critical speed that no plunging of dangerous proportions will build up. This is true because the critical speed must be maintained for a brief interval of time in order for dangerous amplitudes to build up. However, on stopping, the machine if coasting naturally to a stop, will sometimes plunge wildly at critical speed because it does not naturally decelerate through critical speed quickly enough to avoid the building up of excessive amplitudes of vibration.

This invention provides a braking device and motor control circuit for vibrating mechanism which automatically applies a braking force to the rotating system at the proper time to cause rapid deceleration through the critical range and thus avoid excessive plunging.

The motor 7 is preferably an induction motor provided with a built-in, solenoid-operated, friction brake of well known type (schematically shown at 8 in Figs. 2 and 3) in which the braking force is applied by springs 9, the force of which is overcome by solenoid 11 when the solenoid is energized.

Figure 2:
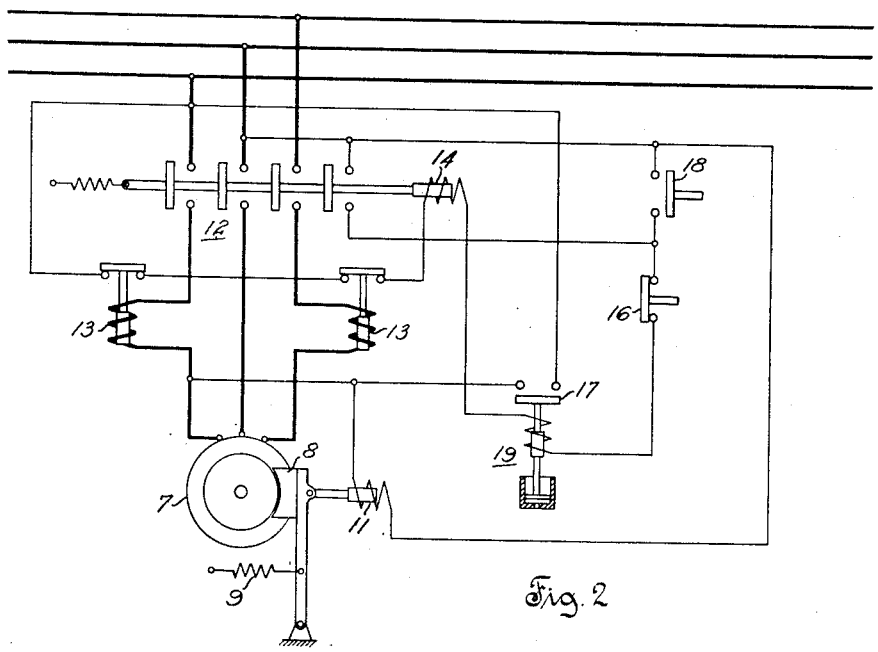
Fig. 2 is a schematic diagram of a control circuit for the motor of Fig. 1 embodying the invention with mechanical braking.

As shown in Fig. 2 the motor control circuit according to the invention may be a conventional circuit including a three-phase induction motor 7 connected through a contactor 12 to the line, with overload relays 13 in the circuit of the operating coil 14 which is connected through a normally closed stop button 16 to the line through holding contact 17 and/or normally open start button 18. The circuit of the invention may be distinguished from the conventional automatic solenoid brake circuit however by the inclusion of a time delay relay 19 of the well known dashpot type which connects one terminal of the brake solenoid 11 to the line, bridging the contactor 12, the other terminal being permanently connected to the line. The operating coil of time delay relay 19 is in series with the operating coil 14 of contactor 12. It will be seen that the control circuit of Fig. 2 is shown in deenergized condition. To start the device, start button 18 is pressed, momentarily, energizing operating coil 14 and the operating coil of time delay relay 19. Operating coil 14 closes contactor 12 causing holding contact 17 to bridge the start button 18 and keep operating coil 14, and the operating coil of time delay relay 19, energized. The closing of contactor 12 will immediately energize motor 7 and brake solenoid 11, causing the motor to start and accelerate the mechanism 4 rapidly through the critical speed of the device 1 to operating speed, and maintain it in operation at its normal operating speed. Meanwhile, time delay relay 19 after a brief delay, depending on its time setting, will close, completing a circuit for brake solenoid 11 which entirely bridges the contactor 12, and the brake will stay in released position during normal operation of the device. When it is desired to stop the device 1, stop button 16 is pressed momentarily, deenergizing operating coil 14 and allowing contactor 12 to open, breaking the main motor circuit. The breaking of contact 17 prevents reenergization of operating coil 14 when the stop button 16 is released, until start button 18 is again pressed. After the operating coil of time delay relay 19 is deenergized, the dashpot prevents immediate opening of the relay during a time interval predetermined by the relay setting, and solenoid 11 is thus kept in an energized condition, preventing application of brake 8 and permitting normal coasting deceleration of motor 7 and mechanism 4. The interval during which time delay relay 19 keeps brake solenoid 11 energized, after actuation of the stop button 16, is arranged to be only of such length as to permit a normal coasting down to a speed just above critical. The brake 8 will be automatically applied upon opening of time delay relay 19, and will cause rapid deceleration of the motor 7, by adequate frictional braking, through the critical speed and to a stopped condition. This frictional braking will, through the medium of belt transmission 6, effect a similar rapid deceleration of mechanism 4 at such a rate that vibrating impulses will be applied to the mass 2 at resonance with the natural frequency of the system of device 1 for only such a brief period that no plunging or vibration at excessive amplitudes will have an opportunity to build up.

Figure 3:
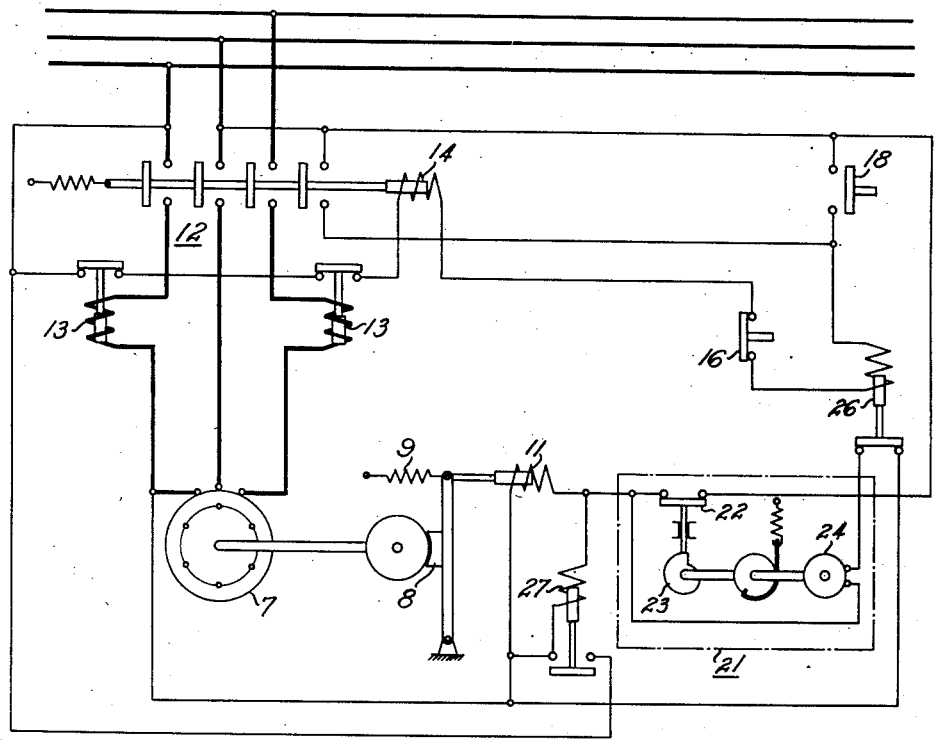
Fig. 3 is a schematic diagram of a modified control circuit with mechanical braking.

Fig. 3 is a modified form of the control circuit of Fig. 2 for a device 1 having a motor 7 with mechanical brake 8, in which the dashpot type time delay relay 19 of Fig. 2 is replaced by a synchronous motor driven time delay relay 21, of known type, in which main contacts 22 are kept normally closed by a spring returned cam 23 and may be opened by a small synchronous timer motor 24 which rotates cam 23 against the force of the spring for a time interval predetermined by the setting of the time delay relay 21, at the end of which time the contacts 22 open. The time delay relay 21 is connected in the circuit through a normally closed relay 26, the operating coil of which is in series with the operating coil of 14 of contactor 12. This relay 26 has its main contacts arranged to connect the timer motor 24 in parallel with brake solenoid 11 upon deenergization of its operating coil. The main contacts of a brake solenoid holding relay 27, having its operating coil in parallel with the solenoid coil 11, are arranged to bridge one pair of contacts of the contactor 12 to connect one terminal of the solenoid coil 11 to the line. The main contacts 22 of time delay relay 21 are arranged to connect the other side of solenoid coil 11 to the line. With the arrangement of Fig. 3, shown in deenergized condition, pressing the starting button 18 will close contactor 12 energizing the motor 7 and solenoid coil 11 to permit normal starting and acceleration of the device 1 to normal operating speed. The energization of the operating coil of relay 26 will keep timer motor 24 deenergized during normal operation of the device 1. Upon pressing stop button 16 contactor 12 will open the motor circuit of motor 7. However, the circuit of solenoid coil 11 will remain completed to the line through relay 27 and timer contacts 22 so that the brake will remain in released condition so long as contacts 22 remain closed. The operating coil of normally closed relay 26 being in series with contactor operating coil 14 the contacts of said relay 26 will close immediately upon pressing of the stop button 16, completing the circuit of timer motor 24 which will rotate cam 23 until timer contacts 22 open, deenergizing solenoid coil 11, holding relay 27 and timer motor 24, permitting the brake 8 to be applied to rapidly decelerate the motor 7 and mechanism 4 through the critical speed and to a stop. The spring reclosing of timer contacts 22 upon deenergization of timer motor 24 resets the device for starting without causing reenergization of any of the electrical control apparatus.

In both Figs. 2 and 3, a pair of conventional overload relays 13 is connected in series with operating coil 14 of contactor 12. Each of these overload relays is capable of breaking the contactor operating coil circuit to cause automatic stopping action identical with that caused by pressing of the corresponding stop button 16, upon occurrence of excessive currents in the main motor driving circuit.

Figure 4:
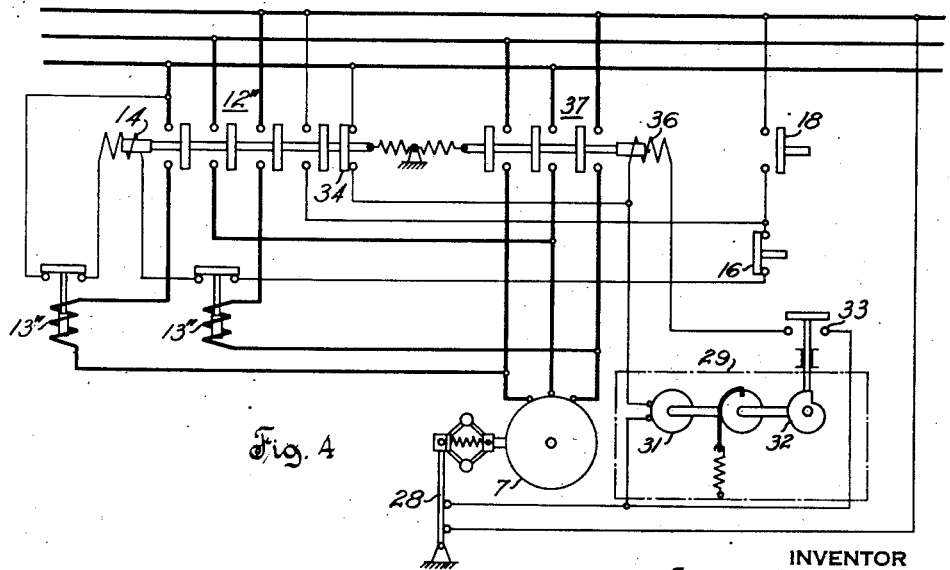
Fig. 4 is a schematic diagram of a control circuit embodying the invention with dynamic braking.

Fig. 4 represents a modified form of control circuit according to the invention. In this form dynamic braking is used instead of mechanical braking. An electric motor 7, for example a three-phase induction motor, may be dynamically braked in known manner by reversing the current to the motor while it is coasting in a normal driving direction, a so-called zero speed switch 28 being arranged to break the reverse circuit of the motor automatically as soon as the motor has been decelerated to a stopped condition. Fig. 4 represents an improved motor controlling and automatic plugging circuit in which, according to the invention, a time delay between deenergization of the normal motor driving circuit and energization of the plugging circuit is introduced. This is accomplished by introducing a time delay relay 29, for example one of known type in which a timer motor 31 operates against a spring returned cam 32 to close normally open main contacts 33 after a certain predetermined time interval. The cam 32 of relay 29 is spring returned to normal starting position after deenergization of timer motor 31, which is in series with zero speed switch 28 and plugging contacts 34 of starting contactor 12″. Upon pressing the starting button 18 of the circuit of Fig. 4 (shown in deenergized condition) the contactor 12″ will be actuated to normal running position, opening plugging contacts 34 and effectively blocking energization of the plugging circuit. The device 1 will then be rapidly accelerated through critical to normal operating speed and remain in operation until stop button 16 or an overload relay 13″ breaks the circuit of contactor operating coil 14. Upon pressing of stop button 16 or opening of overload relay 13″ contactor 12″ will open the normal motor circuit and cause plugging contacts 34 to close. Due to the open timer relay contacts 33, in the circuit of plugging contactor operating coil 36, the plugging contactor 37 will remain open. The timer motor 31 is, however, energized through plugging contacts 34 and zero speed switch 28 which is held closed so long as the motor 7 is coasting in a normal direction. The timer motor will turn cam 32 through a predetermined angle in a predetermined time just sufficient to permit normal coasting deceleration of the device 1 down to a speed just above critical. The closing of timer contacts 33 will then energize operating coil 36 which will cause plugging contactor 37 to close, causing the dynamic braking force of plugging to rapidly decelerate the device through the critical speed to a stopped condition. The plugging circuit will be interrupted upon stopping of the motor 7 by the zero speed switch 28; and the time delay relay or timer 29 will be reset for starting by the spring return feature.

While time delay relays only are shown and described, it will be apparent to those skilled in the art that speed responsive devices may be substituted in various manners to cause the delays desired in application of braking to similar devices.

The invention provides for the first time for an automatic control circuit for vibrating devices which will automatically apply a braking force to the device at the proper time to cause the device to be decelerated as rapidly as possible through the critical speed consistent with strain on the structure and economy of equipment and operation. If mechanical braking is used, the automatic delay in application of the brake eliminates the strain of excessive braking at high speeds when braking is unnecessary, and thus saves wear on the brake. A maximum deceleration through critical speeds is obtained by applying the brakes only at a time when the device has normally coasted down to a speed just above critical. If dynamic braking, or plugging, is used the delay prevents excessively high plugging currents which would occur if the plugging circuit were completed at full speed of the device. A more effective degree of dynamic braking is obtained by delaying the time of plugging until the device has coasted normally down to a speed just above critical and then decelerating at a rapid rate through the critical speed. This simplifies the plugging circuit by elimination of elaborate current limiting devices and enables plugging to be applied precisely at the time when it is needed, saving excessive and unduly prolonged overloads on the motor and control equipment.

While particular control circuits and equipment are specifically described and diagrammatically illustrated hereinabove it will be understood that the invention is intended to include such modifications and equivalents as may occur to persons skilled in the art within the scope of the appended claims.

It is claimed and desired to secure by Letters Patent:

1. In a motor control circuit for an electric motor driving a device having a critical speed and an automatic braking device for said motor, a starting control for completing a normal conductive driving circuit to said motor and rendering said braking device ineffective, a stopping control for disrupting the normal conductive driving circuit to said motor, and delayed action means responsive to actuation of said stopping control for maintaining said braking device ineffective upon disruption of said normal conductive driving circuit by said stopping control for a predetermined substantial time interval after actuation of said stopping control and subsequently rendering said braking device effective to rapidly decelerate said motor through a critical speed to a stopped condition.

2. In a drive for a resiliently mounted rotary vibrating mechanism normally operated at a speed above the critical speed of resonance with the natural frequency of free vibration of said mechanism, an electric motor in driving relation to said mechanism, a source of electrical energy, starting control means to complete a normal conductive driving circuit between said source and said motor to accelerate said mechanism rapidly through said critical speed and operate the same at normal speed, braking means for said mechanism ineffective during existence of said normal conductive driving circuit between said source and said motor, stopping control means operable to disrupt said normal conductive driving circuit between said source and said motor, and delayed action means responsive to operation of said stopping control means to maintain said braking means ineffective for a substantial predetermined interval of time after operation of said stopping control means and subsequently render said braking means effective to rapidly decelerate said mechanism through said critical speed to a stopped condition.

3. In a drive for a resiliently mounted rotary vibrating mechanism normally operated at speed above the critical speed of resonance with the natural frequency of free vibration of said mechanism, an electric motor in driving relation with said mechanism, a source of electrical energy, means operable to selectively complete and disrupt a normal conductive driving circuit between said source and said motor, braking means ineffective during existence of said normal conductive driving circuit between said source and said motor, and delayed action braking control means associated with said braking means and responsive to operation of said selectively operable means to maintain said braking means ineffective for a predetermined substantial period of time after disruption of said normal conductive driving circuit and subsequently render said braking means effective to decelerate said mechanism through said critical speed to a stopped condition.

4. In a drive for a resiliently mounted rotary vibrating mechanism normally operated at a speed above the critical speed of resonance with the natural frequency of free vibration of the mechanism, an electric motor in driving relation to said mechanism, a source of electrical energy selectively operable means for completing and disrupting a normal conductive driving circuit between said source and said motor to accelerate to normal speed and operate said mechanism, delayed action means responsive to actuation of said selectively operable means to maintain said motor in a deenergized condition for a predetermined time interval after disruption of the normal conductive driving circuit of said motor and subsequently complete a conductive dynamic braking circuit between said source and said motor for rapidly decelerating said mechanism through said critical speed, and condition responsive means to disrupt said dynamic braking circuit when said motor is in a stopped condition.

5. In a motor control system, an electric motor, a source of electrical energy, selectively operable means for completing and disrupting a normal conductive operating circuit between said source and said motor, and delayed action means responsive to operation of said selectively operable means to disrupt said normal conductive operating circuit, said delayed action means being operative upon the expiration of a predetermined interval of time after such response to establish a conductive dynamic braking circuit between said source and said motor for rapidly decelerating said motor to a stopped condition.

6. In a motor control system an electric motor, a source of electrical energy, selectively operable means to complete and disrupt a normal conductive operating circuit between said source and said motor, and delayed action braking means for said motor responsive to disruption of said normal conductive operating circuit by said selectively operable means to apply a braking force to said motor upon the expiration of a predetermined interval of time during which said motor is in free coasting condition.

7. In a motor control system, an electric motor, a source of electrical energy, braking means for said motor, selectively operable means to complete and disrupt a normal conductive operating circuit between said source and said motor, means responsive to operation of said selectively operable means to render said braking means ineffective during normal operation of said motor, and delayed action means responsive to disruption of said normal conductive operating circuit between said source and said motor to prevent said braking means from effectively braking said motor until the expiration of a predetermined interval of time.

8. In an electrical motor control system, a source of electrical energy including a pair of conductors, an electric motor having a conductive winding, a circuit making and breaking device selectively operable to establish a normal conductive driving circuit between said winding and said pair of conductors and to disestablish said normal conductive driving circuit, motor braking means, braking control means normally responsive to actuation of said circuit making and breaking device to render said braking means ineffective while said circuit making and breaking device is in position to establish said normal conductive driving circuit, and delayed action means normally responsive to actuation of said circuit making and breaking device to normal driving circuit disestablishing position and connected with said braking control means to maintain said braking means ineffective during a predetermined time interval after normal driving circuit disestablishment.

FREDERICK R. GRUNER.

REFERENCES CITED

The following references are of record in the file of this patent:

UNITED STATES PATENTS

| Number | Name | Date |
|---|---|---|
| 869,356 | Fiedler | Oct. 29, 1907 |
| 1,934,505 | Kenah | Nov. 7, 1933 |
| 2,349,559 | Olcott | May 23, 1944 |
| 2,385,671 | Whiting | Sept. 25, 1945 |